United States Patent [19]
Francis et al.

[11] Patent Number: 5,011,010
[45] Date of Patent: Apr. 30, 1991

[54] COMPACT DISC CONTAINER

[76] Inventors: Nicholas J. Francis, 19545 Hammond Road, Pitt Meadows, B.C., Canada, V3Y 1L5; Vernon E. Stewart, 12031 North Bonson Road, Pitt Meadows, B.C., Canada, V3Y 1K6

[21] Appl. No.: 472,513

[22] Filed: Jan. 30, 1990

[51] Int. Cl.⁵ .............................................. B65D 85/57
[52] U.S. Cl. .................................. 206/307; 206/309; 206/313
[58] Field of Search ............... 206/309, 310, 311, 312, 206/313, 307

[56] References Cited
U.S. PATENT DOCUMENTS

| | | | |
|---|---|---|---|
| 4,159,827 | 7/1979 | Torrington | 206/313 X |
| 4,463,849 | 8/1984 | Prusak et al. | 206/309 X |
| 4,655,344 | 4/1987 | Ackeret | 206/309 |
| 4,702,369 | 10/1987 | Philosophe | 206/309 X |
| 4,771,883 | 9/1988 | Herr et al. | 206/309 X |
| 4,807,749 | 2/1989 | Ackeret | 206/309 X |

Primary Examiner—William I. Price
Attorney, Agent, or Firm—Spensley Horn Jubas & Lubitz

[57] ABSTRACT

A horseshoe-shaped compact disc container having a protective sleeve and a tray slidably displaceable in the sleeve. The container has a release button to enable the container to be readily opened with one hand.

19 Claims, 3 Drawing Sheets

COMPACT DISC CONTAINER

FIELD OF THE INVENTION

This invention relates to a compact disc container having a protective sleeve and a tray slidably displaceable in the sleeve. More particularly, this invention pertains to a compact disc container having a release mechanism which enables the container to be readily opened with one hand.

BACKGROUND OF THE INVENTION

Various compact disc containers are known in the prior art. The most widely used type of container, commonly known as a "jewel box", consists of two generally rectangular mating trays joined along a rear edge by a pair of hinges to form a clam shell-like receptacle. Jewel box containers are typically opened by holding the lower tray in one hand and prying the upper tray open with the other hand. The compact disc is retained in a moulded insert placed in the lower tray. Printed promotional and identifying material is also usually fitted inside the container together with the compact disc.

Although jewel box containers are in widespread use, it is apparent that they suffer from several shortcomings. Firstly, they are relatively expensive to manufacture using conventional injection-moulding technology since they are constructed from three separate pieces (i.e. an upper and lower tray and a moulded insert). Secondly, as a result of their hinged construction, jewel box containers are prone to bending or fracturing over time if they are frequently opened and closed. Thirdly, jewel box containers do not provide a completely dust-free storage environment since the side walls of the upper tray typically include vents.

An additional disadvantage of such conventional compact disc containers is that two hands are ordinarily required to open the container and extract the compact disc. Since compact disc players are now frequently installed in automobiles, the need has arisen for a container which can be readily opened by the vehicle driver without removing both hands from the steering wheel.

In order to avoid the disadvantages inherent in the hinged container construction referred to above, it is known in the prior art to employ slidable rather than hinged retaining trays. For example, U.S. Pat. No. 2,866,541 granted to H. J. Ravis on Dec. 30, 1958 discloses a phonographic record jacket consisting of a drawer-like slide in combination with a protective envelope. In one embodiment, the slide has raised tabs which cooperate with guiding channels in the envelope housing. U.S. Pat. No. 4,463,849 granted to Prusak, et al. on Aug. 7, 1984 discloses a video disc caddy having a tray slidable in an outer protective jacket. U.S. Pat. No. 4,771,883 granted to Herr, et al. on Sept. 20, 1988 discloses an article for storing digital laser disc devices, such as compact discs, which includes an outer plastic housing within which is slidably engaged an insertable drawer member. U.S. Pat. No. 4,702,369 granted to Philosophe on Oct. 27, 1987 and U.S. Pat. No. 4,159,827 granted to Torrington on Jul. 3, 1979 also disclose various slidable trays for housing compact discs and the like.

Several of the above-referenced patents incorporate relatively complicated mechanisms for inserting the compact or video disc into an associated compact or video disc player and, accordingly, such containers are not designed for mass production. Further, none of the aforementioned references include a release mechanism to facilitate opening the container with one hand.

SUMMARY OF THE INVENTION

In accordance with the invention, there is provided a sleeve having an enclosed cavity and a disc-retaining tray slidably displaceable in the cavity. The sleeve has an inner end and an open outer end. The tray also has an inner end and an outer end. The tray is slidably displaceable within the cavity between a closed position whereat the tray is enclosed within the sleeve, and an open position whereat the tray extends outwardly from the sleeve outer end. The container also includes a locking means for releasably locking the tray in the closed position, and a release means for disengaging the locking means, whereby gravitational forces may slide the tray from the closed position to the open position when the container is oriented with the sleeve inner end above the sleeve outer end.

The locking means preferably includes four pairs of stop tabs. The first and second pair of stop tabs are located on the inner portion of the tray. The third pair of stop tabs is located on the inner portion of the sleeve. The fourth pair of stop tabs is located on the outer portion of the sleeve. The first pair of stop tabs frictionally engage the third pair of stop tabs when the tray is in the closed position, and the second pair of stop tabs contact the fourth pair of stop tabs when the tray is in the open position.

Preferably the release means is a button protruding from the tray inner end through a mating aperture located in the sleeve inner end. Manual depression of the button when the tray is in the closed position causes the first pair of stop tabs to disengage the third pair of stop tabs, thereby permitting the tray to slide freely between the closed and open positions.

The present invention may also include a guide means, namely a raised rib extending along the central, longitudinal axis of the tray between the tray inner end and the tray outer end, and a mating channel on the sleeve for slidably receiving the rib. Advantageously, the guide means may also include raised stabilizing rails on the tray extending parallel to the rib in spaced relation thereto to maintain the tray in a substantially horizontal plane relative to the sleeve when the tray is slid between the open and closed positions.

The tray is removably detachable from the sleeve by tilting the tray outer end upwardly while pulling the tray outwardly from the sleeve, thereby causing the second pair of stop tabs to slide past the fourth pair of stop tabs.

Preferably, the first and second pair of stop tabs are spaced apart on opposite sides of the tray rib and the third and fourth pair of stop tabs are spaced apart on opposite sides of the sleeve channel. The third pair of stop tabs are preferably located adjacent the stabilizing rails.

The sleeve also includes top, intermediate and bottom surfaces disposed in parallel planes. A slot for the insertion of printed material is defined between the top and the intermediate surfaces. The slot has an opening at the sleeve outer end.

The tray outer end preferably includes a vertical flange which substantially seals the sleeve outer end when the tray is in the closed position to provide a substantially dust-free storage environment within the container. A thumb groove is provided on the top surface of the sleeve adjacent the sleeve outer end to enable the top edge of the flange to be withdrawn from the sleeve outer end when the tray is in the closed position.

Advantageously, the sleeve inner end and the tray inner end are semi-circular.

DETAILED DESCRIPTION OF THE PREFERRED EMBODIMENT

Figure 1:
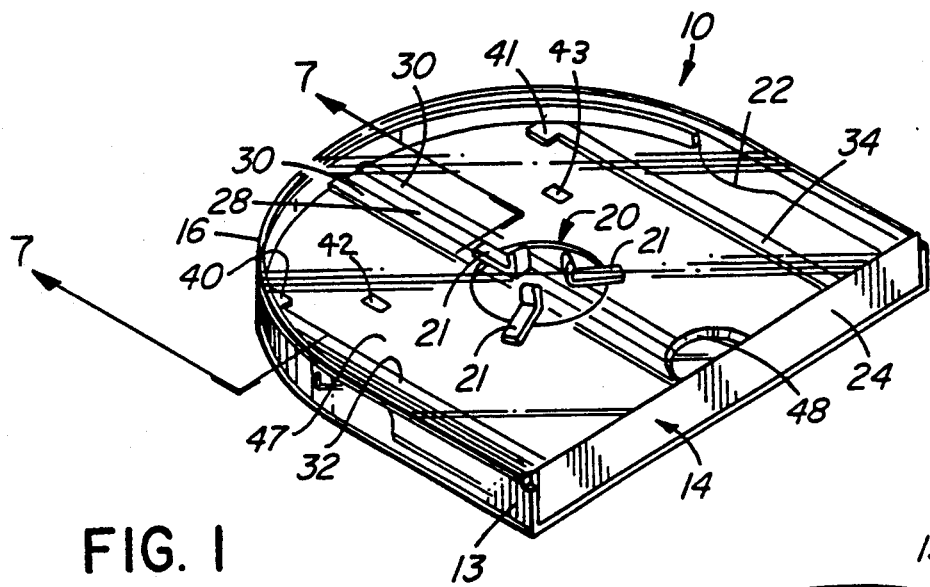
FIG. 1 is an isometric view of the preferred compact disc container in its closed position.
Figure 2:
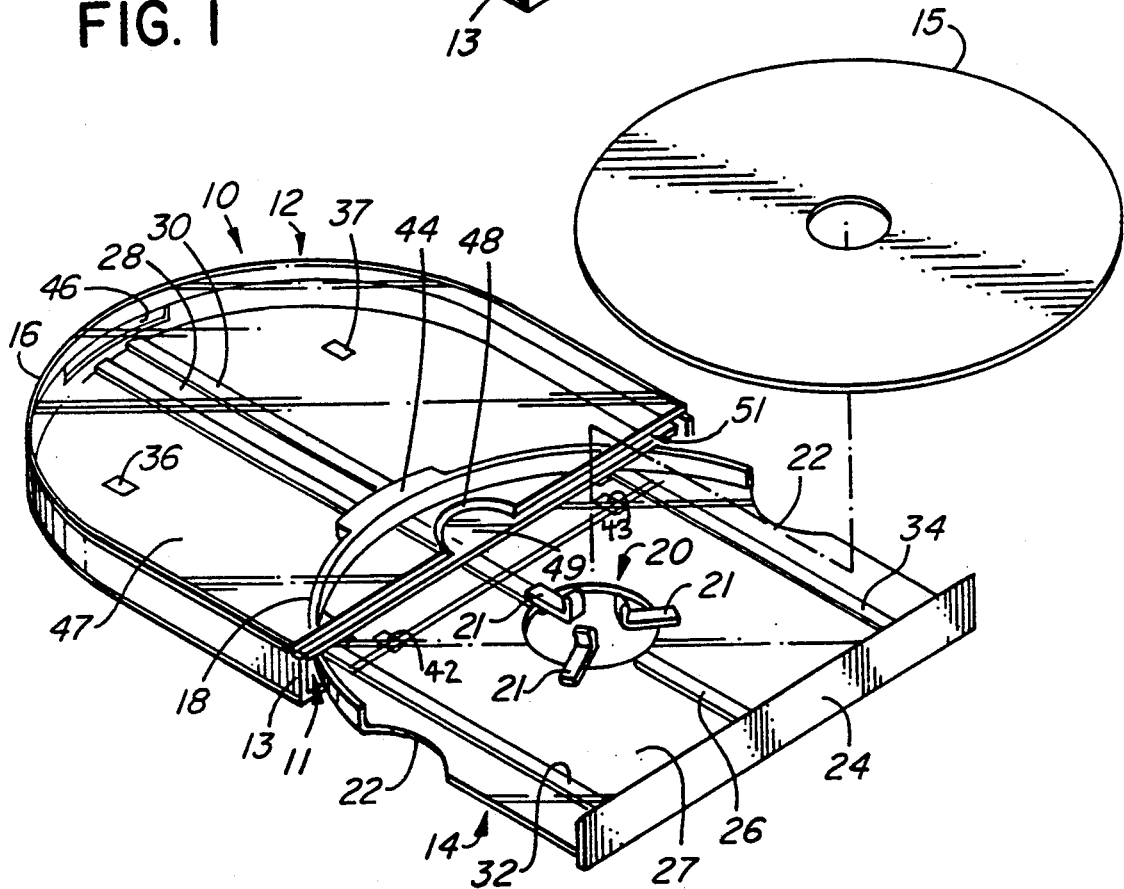
FIG. 2 is an isometric view of the preferred compact disc container in its open position, with the compact disc removed for clarity of illustration.

Compact disc container 10 incorporates a protective sleeve 12 having an open slot 11 at end 13, and a drawer-like tray 14 which is slidably displaceable through slot 11 within sleeve 12 between the closed position shown in FIG. 1 and the open position shown in FIG. 2.

Sleeve 12 and tray 14 are generally horseshoe-shaped, having conformed, semi-circular rear walls labelled 16 and 18 respectively. Rear wall 18 lies against rear wall 16 when container 10 is in the closed position shown in FIG. 1. The radius of curved walls 16,18 is slightly larger than the radius of a conventional compact disc. Preferably, sleeve 12 and tray 14 are composed of transparent plastic to permit visual inspection of the compact disc without opening container 10.

Figure 4:
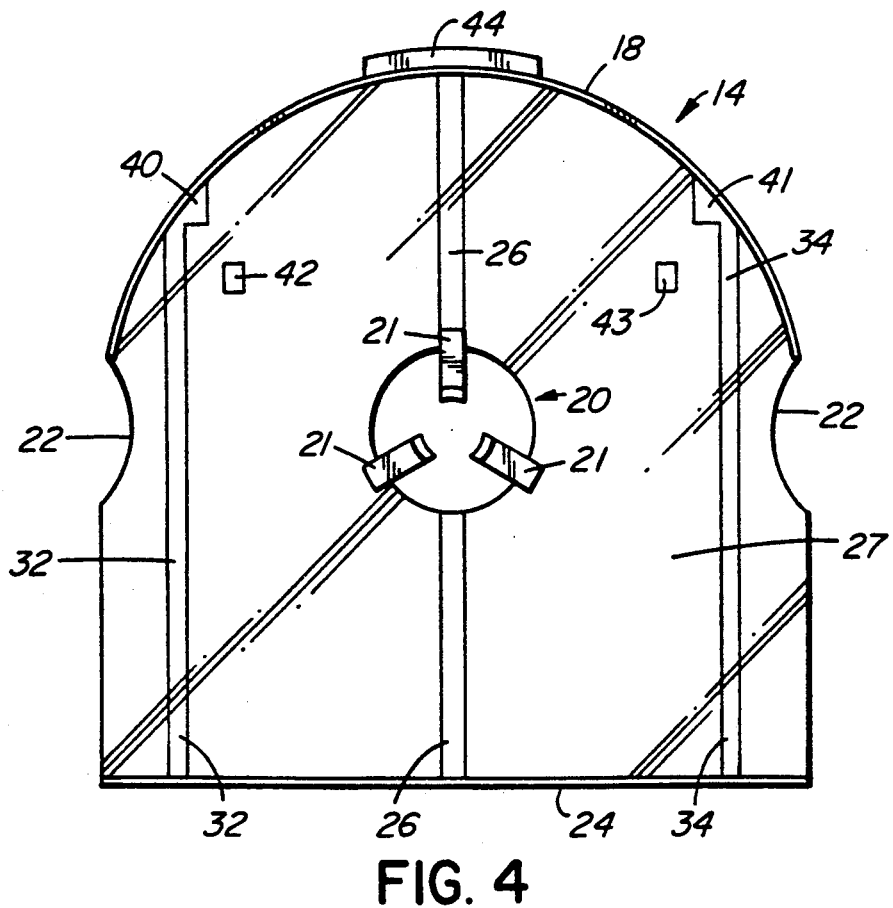
FIG. 4 is a plan view of the slidable tray portion of the compact disc container.

As shown best in FIGS. 2 and 4, tray 14 is constructed to house a single compact disc 15. Tray 14 has a planar lower surface 27 and a centrepiece 20 comprising three flexible, L-shaped retention fingers 21 for retaining compact disc 15 above the plane of lower surface 27. Tray 14 also includes opposed finger cutouts 22 to assist in removing compact disc 15 when container 10 is opened.

Tray 14 further includes a vertical flange 24 which extends transversely across the outer end of tray 14 to seal slot 11 when tray 14 is fully inserted within protective sleeve 12. Accordingly, container 10 provides a sealed, substantially dust-free environment for storing compact disc 15.

Figure 3:
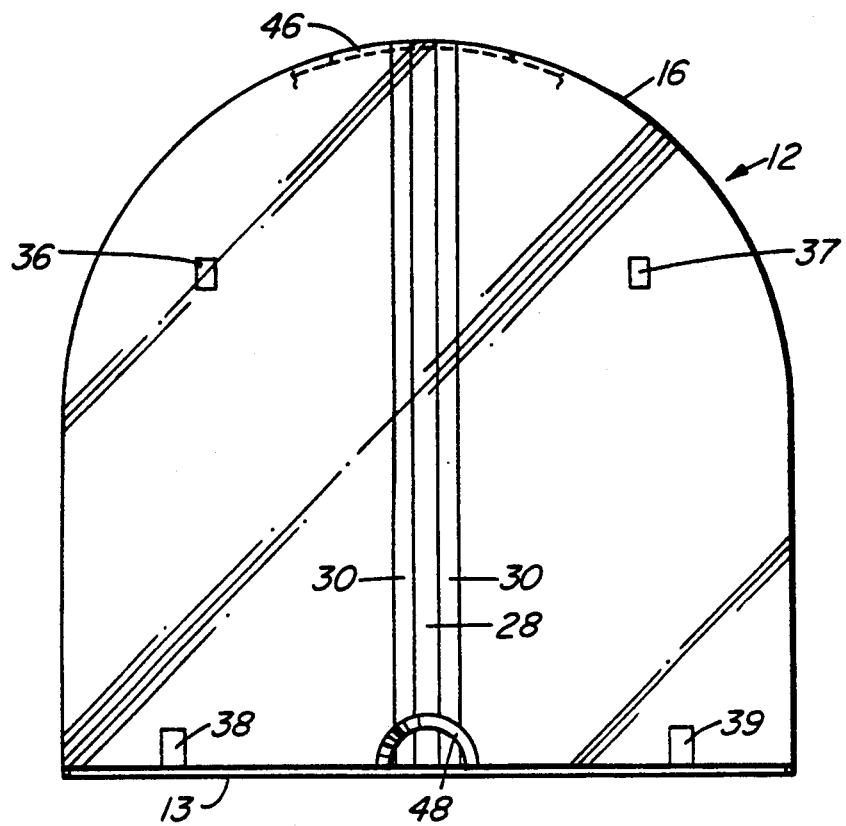
FIG. 3 is a plan view of the protective sleeve portion of the compact disc container.
Figure 7:
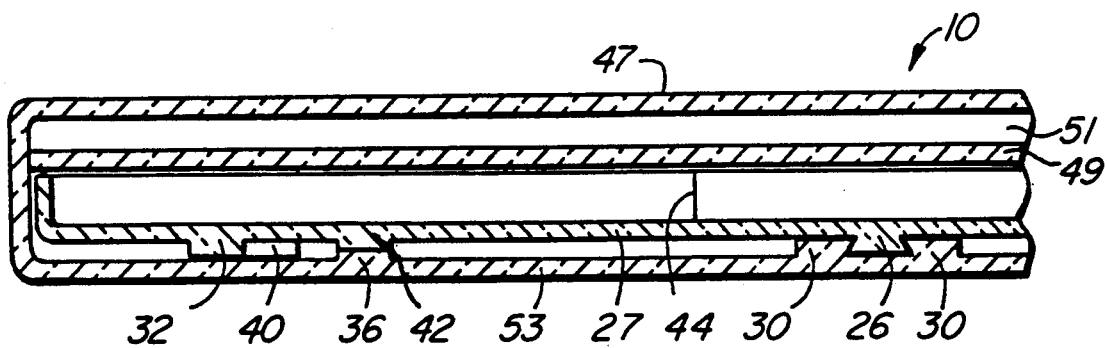
FIG. 7 is an enlarged, fragmented, sectional view of the compact disc container taken along section line 7—7 of FIG. 1 and looking in the direction of the arrows.

As best seen in FIG. 4, container 10 also includes "guiding means"; namely, a raised rib 26 which projects downwardly from lower surface 27 of tray 14 and which extends along the central, longitudinal axis of tray 14 between flange 24 and curved rear wall 18. Rib 26 may be interrupted at centrepiece 20. With reference to FIGS. 2, 3 and 7, rib 26 is slidable within a channel 28 defined in lower surface 53 of sleeve 12 between upwardly projecting parallel guide rails 30. As shown best in FIG. 7, rib 26 and channel 28 are preferably dovetailed for secure mating engagement thereof.

As shown in FIG. 4, the guiding means also preferably includes stabilizing rails 32,34 which project downwardly from lower surface 27 of tray 14 and which extend between flange 24 and curved rear wall 18 parallel to rib 26. Stabilizing rails 32,34 are positioned in spaced relation on either side of rib 26 to maintain tray 14 in a substantially horizontal plane, relative to sleeve 12, as tray 14 slides between the open and closed positions.

Figure 5:
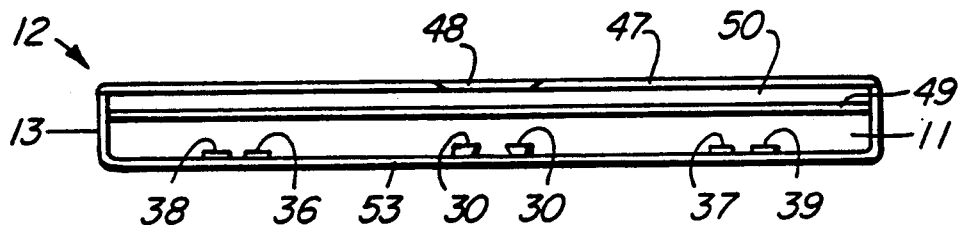
FIG. 5 is a front elevational view of the protective sleeve portion of the compact disc container.

With reference to FIG. 5, sleeve 12 preferably has an upper surface 47, an intermediate surface 49 and a lower surface 53 extending in parallel planes. A slot 50 is defined between upper surface 47 and intermediate surface 49. As shown in FIG. 2, slot 50 has an opening 51 above slot 11 at end 13 of sleeve 12. Slot 50 is provided for insertion of identifying or promotional printed material such as song titles or bibliographic information about the recording artist. Typically the printed material will not occupy all of slot 50, so it will still be possible to visually inspect a portion of compact disc 15 when container 10 is closed. Printed inserts conforming to the outline of lower surface 27 may also be fitted into tray 14.

A "locking means", such as four pairs of interacting stop tabs, may be strategically placed to releasably lock tray 14 in the closed position shown in FIG. 1, and to prevent tray 14 from sliding completely out of protective sleeve 12 when tray 14 is extended into the open position as shown in FIG. 2. More particularly, sleeve 12 has four stop tabs 36, 37, 38, 39 which project upwardly from lower surface 53 of sleeve 12. As shown best in FIG. 3, tabs 36 and 37 are spaced apart in the inner portion of surface 53 on either side of channel 28. Tabs 38 and 39 are similarly spaced apart in the outer portion of surface 53, proximate to end 13.

Tray 14 has corresponding stop tabs 40, 41, 42, 43 which project downwardly from lower surface 27 of tray 14. As shown in FIG. 4, stop tabs 40 and 41 are spaced apart proximate to stabilizing rails 32 and 34 respectively. Tabs 42 and 43 are similarly spaced apart in the inner portion of tray 14 on either side of rib 26.

When container 10 is in the closed position shown in FIGS. 1 and 7, stop tab 42 frictionally engages stop tab 36 and stop tab 43 frictionally engages stop tab 37 to prevent rib 26 from sliding freely in channel 28. When stop tabs 42 and 43 are disengaged from stop tabs 36 and 37 as discussed further below, and container 10 is oriented so that the curved rear end 16 of sleeve 12 is raised above end 13, tray 14 may slide by gravity to the open position shown in FIG. 2, until stop tab 40 contacts stop tab 38 and stop tab 41 simultaneously contacts stop tab 39.

If required, tray 14 may be completely detached from sleeve 12 by gripping flange 24 and tilting the outer end of tray 14 upwardly while pulling it outwardly from sleeve 12; this enables stop tabs 40, 41 to slide over top of corresponding stop tabs 38, 39. (Removal of tray 14 may be facilitated by placing a thin piece of paper between stop tabs 40, 41 and corresponding stop tabs 38, 39 while pulling tray 14 as aforesaid.) Tray 14 can be reinserted in sleeve 12 by reversing the above-described tilting and pulling motions.

Figure 6:
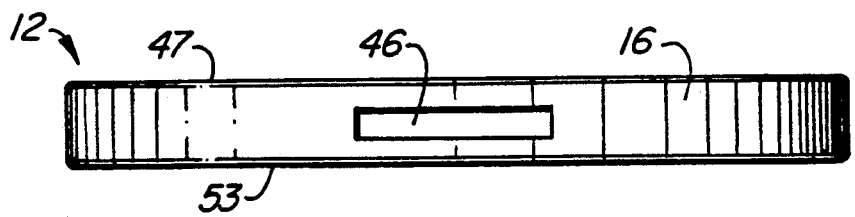
FIG. 6 is a rear elevational view of the protective sleeve portion of the compact disc container.

Container 10 also has "release means" for disengaging the locking means to permit tray 14 to slide freely to the open position shown in FIG. 2. As best seen in FIG. 4, the release means includes a button 44 which protrudes rearwardly from the central portion of curved rear wall 18 of tray 14. As shown in FIG. 6, the rear wall 16 of sleeve 12 has a small aperture 46 which allows button 44 to project through rear wall 16 when tray 14 is fully inserted to the closed position shown in FIG. 1. By gripping the sides of sleeve 12 between the thumb and forefinger and pressing button 44 with the index finger, one may frictionally disengage stop tabs 42 and 43 from stop tabs 36 and 37, thereby permitting sliding movement of rib 26 within mating channel 28 as aforesaid. When container 10 is in the closed position shown in FIG. 1, button 44 substantially obstructs aperture 46 to prevent atmospheric dust and the like from entering container 10.

Alternatively, container 10 may be opened by manually pulling flange 24 of tray 14 outwardly from sleeve 12 to disengage stop tabs 42 and 43 from corresponding stop tabs 36 and 37 as aforesaid. As shown best in FIG. 2, a thumb depression 48 is provided on the upper surface of sleeve 12 adjacent end 13 to assist the user in gripping the upper edge of flange 24 in order to pull tray 14 outwardly from sleeve 12. Thumb depression 48 also enables printed material to be readily inserted into or removed from slot 50.

Unlike conventional hinged jewel box compact disc containers which require the user to use both hands to pry the container open, the present invention can be conveniently opened with one hand. In operation, the user rests closed container 10 in the palm of one hand with the curved rear wall 16 of sleeve 12 tilted above end 13. The side walls of sleeve 12 are gripped with the thumb and forefinger of the hand. The user can then manually depress button 44 with the index finger of the same hand to cause stop tabs 42 and 43 to disengage stop tabs 36 and 37 respectively. Tray 14 may then slide by gravity to the open, extended position shown in FIG. 2. Compact disc 15 can then be readily extracted by depressing retention fingers 21 and gripping the edges of compact disc 15 at opposed finger cutouts 22. If the user only has one hand available he may set container 10 down on a support surface after it has been opened before attempting to extract compact disc 15. The present invention is particularly useful in automobiles having compact disc players, since it allows the driver to open a compact disc container, extract the disc, and insert the disc into the player without removing both hands from the steering wheel.

Alternatively, container 10 may be opened by supporting sleeve 12 with one hand and pulling tray 14 outwardly from sleeve 12 by gripping the upper edge of flange 24 with the other hand at thumb groove 48.

Sleeve 12 and tray 14 may be mass-produced using injection-moulding technology. As a result of the horseshoe-shape of container 10, less plastic is required per container than conventional jewel box receptacles. Further, since there are only two separate parts (i.e. sleeve 12 and tray 14) the invention may be mass produced at a lower per unit cost than conventional containers.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

I claim:
1. A disc container comprising:
   (a) a sleeve having an enclosed cavity, said sleeve having an inner end and an open outer end;
   (b) a disc-retaining tray having an inner end and an outer end, said tray being slidably displaceable within said cavity between a closed position whereat said tray is enclosed within said sleeve, and an open position whereat said tray extends outwardly from said sleeve outer end;
   (c) locking means for releasably locking said tray in said closed position; and,
   (d) release means extending through said sleeve inner end and operatively associated with said tray inner end for disengaging said locking means, whereby gravitational forces may slide said tray from said closed position to said open position when said container is oriented with said sleeve inner end above said sleeve outer end.

2. A container as defined in claim 1, wherein said release means comprises a button on said tray inner end adapted to project through a mating aperture in said sleeve inner end when said tray is in said closed position, whereby outward displacement of said button causes disengagement of said locking means.

3. A container as defined in claim 2, wherein said locking means comprises:
   (a) first and second pairs of stop tabs located on the inner portion of said tray;
   (b) a third pair of stop tabs located on the inner portion of said sleeve; and,
   (c) a fourth pair of stop tabs located on the outer portion of sad sleeve, wherein said first pair of stop tabs frictionally engage said third pair of stop tabs when said tray is in said closed position, and wherein said second pair of stop tabs contact said fourth pair of stop tabs when said tray is in said open position.

4. A container as defined in claim 3, wherein outward displacement of said button causes said first pair of stop tabs to disengage said third pair of stop tabs, thereby permitting sliding movement of said tray between said closed and open positions.

5. A container as defined in claim 3, further comprising guiding means for guiding sliding movement of said tray in said sleeve cavity, said guiding means comprising a raised rib extending along the central, longitudinal axis of said tray between said tray inner end and said tray outer end, and a mating channel on said sleeve for slidably receiving said rib.

6. A container as defined in claim 5, wherein said guiding means further comprises a pair of raised stabilizing rails on said tray extending parallel to said rib and spaced therefrom to maintain said tray in a substantially horizontal plane relative to said sleeve when said tray slides between said closed and open positions.

7. A container as defined in claim 6, wherein said first and second pairs of stop tabs are spaced apart on opposite sides of said rib and wherein said third and fourth pairs of stop tabs are spaced apart on opposite sides of said channel.

8. A container as defined in claim 7, wherein said third pair of stop tabs are adjacent said stabilizing rails.

9. A container as defined in claim 3, wherein said tray is removably detachable from said sleeve by tilting said tray outer end upwardly while pulling said tray outwardly from said sleeve, thereby causing said second pair of stop tabs to slide past said fourth pair of stop tabs.

10. A container as defined in claim 1, further comprising guiding means for guiding sliding movement of said tray in said sleeve cavity, said guiding means comprising a raised rib extending along the central, longitudinal axis of said tray between said tray inner end and said tray outer end, and a mating channel on said sleeve for slidably receiving said rib.

11. A container as defined in claim 10, wherein said guiding means further comprises a pair of raised stabilizing rails on said tray extending parallel to said rib and spaced therefrom to maintain said tray in a substantially horizontal plane relative to said sleeve when said tray slides between said closed and open positions.

12. A container as defined in claim 1, wherein said sleeve has top, intermediate and bottom surfaces disposed in parallel planes, said top and intermediate surfaces defining a slot therebetween for insertion of printed material thereinto, said slot having an opening at said sleeve outer end.

13. A container as defined in claim 12, wherein said tray outer end comprises a vertical flange extending between said top and bottom surfaces which substantially seals said sleeve cavity when said tray is in said closed position, thereby providing a substantially dust-free storage environment within said sleeve cavity.

14. The container as defined in claim 13, further comprising a thumb groove on said sleeve top surface adjacent said sleeve outer end to enable the top edge of said flange to be manually withdrawn from said sleeve outer end when said tray is in said closed position.

15. The container as defined in claim 1, wherein said sleeve inner end and said tray inner end are semi-circular.

16. A disc container comprising:
(a) a sleeve having an enclosed cavity, said sleeve having an inner end and an open outer end;
(b) a disc-retaining tray having an inner end and an outer end, said tray being slidably displaceable within said cavity between a closed position whereat said tray is enclosed within said sleeve, and an open position whereat said tray extends outwardly from said sleeve outer end;
(c) locking means for releasably locking said tray in said closed position; and,
(d) release means for disengaging said locking means, whereby gravitational forces may slide said tray from said closed position to said open position when said container is oriented with said sleeve inner end above said sleeve outer end, wherein said sleeve has top, intermediate and bottom surfaces disposed in parallel planes, said top and intermediate surfaces defining a slot therebetween for insertion of printed material thereinto, said slot having an opening at said sleeve outer end.

17. A container as defined in claim 16, wherein aid tray outer end comprises a vertical flange extending between said top and bottom surfaces which substantially seals said sleeve cavity when said tray is in said closed position, thereby providing a substantially dust-free storage environment within said sleeve cavity.

18. The container as defined in claim 17, further comprising a thumb groove on said sleeve top surface adjacent said sleeve outer end to enable the top edge of said flange to be manually withdrawn from said sleeve outer end when said tray is in said closed position.

19. A disc container comprising:
(a) a sleeve having an enclosed cavity, said sleeve having an inner end and an open outer end;
(b) a disc-retaining tray having an inner end and an outer end, said tray being slidably displaceable within said cavity between a closed position whereat said tray is enclosed within said sleeve, and an open position whereat said tray extends outwardly from said sleeve outer end;
(c) locking means for releasably locking said tray in said closed position; and
(d) release means for disengaging said locking means, whereby gravitational forces may slide said tray from said closed position to said open position when said container is oriented with said sleeve inner end above said sleeve outer end, wherein said sleeve inner end and said tray inner end are semi-circular.

* * * * *